United States Patent
Geiger et al.

(10) Patent No.: US 11,238,873 B2
(45) Date of Patent: Feb. 1, 2022

(54) APPARATUS AND METHOD FOR CODEBOOK LEVEL ESTIMATION OF CODED AUDIO FRAMES IN A BIT STREAM DOMAIN TO DETERMINE A CODEBOOK FROM A PLURALITY OF CODEBOOKS

(71) Applicant: Fraunhofer-Gesellschaft zur Foerderung der angewandten Forschung e.V., Munich (DE)

(72) Inventors: Ralf Geiger, Erlangen (DE); Markus Schnell, Nuremberg (DE); Manfred Lutzky, Nuremberg (DE); Marco Diatschuk, Weisendorf (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 591 days.

(21) Appl. No.: 13/856,468

(22) Filed: Apr. 4, 2013

(65) Prior Publication Data
US 2013/0226596 A1    Aug. 29, 2013

Related U.S. Application Data

(63) Continuation of application No. PCT/EP2011/067466, filed on Oct. 6, 2011.
(Continued)

(51) Int. Cl.
*G10L 19/008*     (2013.01)
*H03M 7/40*     (2006.01)
(Continued)

(52) U.S. Cl.
CPC ........ *G10L 19/008* (2013.01); *G10L 19/0017* (2013.01); *H04N 7/152* (2013.01)

(58) Field of Classification Search
CPC .. G10L 19/008; G10L 19/032; G10L 19/0017; G10L 19/10; H04M 3/564;
(Continued)

(56) References Cited

U.S. PATENT DOCUMENTS 5,701,392 A * 12/1997 Adoul ................. G10L 19/10
                                                               704/219
6,502,068 B1    12/2002 Misu
(Continued)

FOREIGN PATENT DOCUMENTS

AU       2011311543 B2    5/2015
CN       1989548 A    6/2007
(Continued)

OTHER PUBLICATIONS

English translation of Official Communication issued in corresponding Chinese Patent Application No. 201180048603.3, dated May 15, 2014.
(Continued)

*Primary Examiner* — Farzad Kazeminezhad
(74) *Attorney, Agent, or Firm* — Keating & Bennett, LLP

(57) ABSTRACT

An apparatus for level estimation of an encoded audio signal is provided. The apparatus has a codebook determinator for determining a codebook from a plurality of codebooks as an identified codebook. The audio signal has been encoded by employing the identified codebook. Moreover, the apparatus has an estimation unit configured for deriving a level value associated with the identified codebook as a derived level value and for estimating a level estimate of the audio signal using the derived level value.

22 Claims, 11 Drawing Sheets

Related U.S. Application Data

(60) Provisional application No. 61/390,739, filed on Oct. 7, 2010.

(51) Int. Cl.
    *H03M 7/18* (2006.01)
    *H04M 3/56* (2006.01)
    *G10L 19/10* (2013.01)
    *G10L 19/032* (2013.01)
    *G10L 19/00* (2013.01)
    *H04N 7/15* (2006.01)

(58) Field of Classification Search
    CPC .......... H04M 13/01; H03M 7/40; H03M 7/18; H04L 1/0618; H04B 7/0417
    USPC .................. 704/503, 270, 230, 500, 219
    See application file for complete search history.

(56) References Cited

U.S. PATENT DOCUMENTS

| | | | |
|---|---|---|---|
| 6,553,535 B1* | 4/2003 | Asada | H03M 13/11 375/269 |
| 6,704,705 B1* | 3/2004 | Kabal | G10L 19/032 704/230 |
| 6,975,254 B1 | 12/2005 | Sperschneider et al. | |
| 2002/0044073 A1* | 4/2002 | Ungerboeck | H03M 7/40 341/65 |
| 2002/0044611 A1* | 4/2002 | Hassibi | H04L 1/0618 375/267 |
| 2004/0172252 A1* | 9/2004 | Aoki | H04M 3/564 704/270 |
| 2006/0271357 A1 | 11/2006 | Wang et al. | |
| 2007/0283210 A1* | 12/2007 | Prasad | H03M 13/01 714/755 |
| 2008/0002842 A1 | 1/2008 | Neusinger et al. | |
| 2008/0071530 A1 | 3/2008 | Ehara | |
| 2009/0094026 A1 | 4/2009 | Cao et al. | |
| 2009/0248425 A1* | 10/2009 | Vetterli | G10L 19/008 704/503 |
| 2010/0177742 A1* | 7/2010 | Tang | H04B 7/0417 370/335 |
| 2011/0238426 A1* | 9/2011 | Fuchs | G10L 19/0017 704/500 |
| 2011/0305272 A1* | 12/2011 | Moriya | H03M 7/18 375/240 |

FOREIGN PATENT DOCUMENTS

| | | |
|---|---|---|
| CN | 101609674 A | 12/2009 |
| CN | 101816038 A | 8/2010 |
| EP | 1 521 241 A1 | 4/2005 |
| JP | 8-123495 A | 5/1996 |
| JP | 2001-92500 A | 4/2001 |
| JP | 2002-534702 A | 10/2002 |
| RU | 2 335 845 C2 | 10/2008 |
| RU | 2 361 288 C2 | 7/2009 |
| WO | 03/084076 A1 | 10/2003 |

OTHER PUBLICATIONS

English translation of Official Communication issued in corresponding Japanese Patent Application No. 2013-532195, dated Jun. 24, 2014.
Official Communication issued in International Patent Application No. PCT/EP2011/067466, dated Dec. 14, 2011.
Quackenbush et al., "Noiseless Coding of Quantized Spectral Components in MPEG-2 Advanced Audio Coding," Applications of Signal Processing to Audio and Acoustics, Oct. 19, 1997, pp. 1-4.
Bosi et al., "ISO/IEC MPEG-2 Advanced Audio Coding," J. Audio Eng. Soc., vol. 45, No. 10, Oct. 1997, pp. 789-814.
Schnell et al., "Delayless Mixing—on the Benefits of MPEG-4 AAC-ELD in High Quality Communication Systems," Audio Engineering Society Convention Paper 7337, May 17-20, 2008, pp. 1-10.
"Gateway Control Protocol: Decomposed Multipoint Control Unit, Audio, Video and Data Conferencing Packages," ITU-T Standard, International Telecommunication Union, Mar. 15, 2004, pp. 1-32.
Official Communication issued in corresponding Russian Patent Application No. 2013120547, dated Jan. 30, 2015.
Official Communication issued in corresponding Japanese Patent Application No. 2013-532195, dated Jul. 14, 2015.

* cited by examiner

APPARATUS AND METHOD FOR CODEBOOK LEVEL ESTIMATION OF CODED AUDIO FRAMES IN A BIT STREAM DOMAIN TO DETERMINE A CODEBOOK FROM A PLURALITY OF CODEBOOKS

CROSS-REFERENCE TO RELATED APPLICATIONS

This application is a continuation of copending International Application No. PCT/EP2011/067466, filed Oct. 6, 2011, which is incorporated herein by reference in its entirety, and additionally claims priority from U.S. Provisional Application No. 61/390,739, filed Oct. 7, 2010, which is also incorporated herein by reference in its entirety.

BACKGROUND OF THE INVENTION

The present invention relates to audio processing and in particular to an apparatus and method for level estimation of encoded audio signals in a bit stream domain.

Audio processing has advanced in many ways and it has been subject of many studies, how to efficiently encode and decode an audio data signals. Efficient encoding is, for example, provided by MPEG AAC (MPEG=Moving Pictures Expert Group; AAC=Advanced Audio Coding).

According to MPEG AAC, spectral values of an audio signal are encoded employing scalefactors, quantization and codebooks, in particular Huffman Codebooks.

Before Huffman encoding is conducted, the encoder groups the plurality of spectral coefficients to be encoded into different sections. For each section of spectral coefficients, the encoder chooses a Huffman Codebook for Huffman-encoding. MPEG AAC provides eleven different Spectrum Huffman Codebooks for encoding spectral data from which the encoder selects the codebook being best suited for encoding the spectral coefficients of the section. The encoder provides a codebook identifier identifying the codebook used for Huffman-encoding of the spectral coefficients of the section to the decoder as side information.

On a decoder side, the decoder analyses the received side information to determine which one of the plurality of Spectrum Huffman Codebooks has been used for encoding the spectral values of a section. The decoder conducts Huffman Decoding based on the side information about the Huffman Codebook employed for encoding the spectral coefficients of the section which is to be decoded by the decoder.

After Huffman Decoding, a plurality of quantized spectral values is obtained at the decoder. The decoder may then conduct inverse quantization to invert a non-uniform quantization that may have been conducted by the encoder. By this, inverse-quantized spectral values are obtained at the decoder.

However, the inverse-quantized spectral values may still be unscaled. The derived unscaled spectral values have been grouped into scalefactor bands, each scalefactor band having a common scalefactor. The scalefactor for each scalefactor band is available to the decoder as side information, which has been provided by the encoder. Using this information, the decoder multiplies the unscaled spectral values of a scalefactor band by their scalefactor. By this, scaled spectral values are obtained.

Encoding and decoding of spectral values according to the state of the art is now explained with reference to FIGS. 7-10.

FIG. 7 illustrates an encoder according to the state of the art. The encoder comprises a T/F filterbank 710 for transforming an audio signal AS, which shall be encoded, from a time domain into a frequency domain to obtain a frequency-domain audio signal. The frequency-domain audio signal is fed into a scalefactor unit 720 for determining scalefactors. The scalefactor unit 720 is adapted to divide the spectral coefficients of the frequency-domain audio signal in several groups of spectral coefficients called scalefactor bands, which share one scalefactor. A scalefactor represents a gain value used for changing the amplitude of all spectral coefficients in the respective scalefactor band. The scalefactor unit 720 is moreover adapted to generate and output unscaled spectral coefficients of the frequency-domain audio signal.

Moreover, the encoder in FIG. 7 comprises a quantizer for quantizing the unscaled spectral coefficients of the frequency-domain audio signal. The quantizer 730 may be a non-uniform quantizer.

After quantization, the quantized unscaled spectra of the audio signal are fed into a Huffman encoder 740 for being Huffman-encoded. Huffman coding is used for reduced redundancy of the quantized spectrum of the audio signal. The plurality of unscaled quantized spectral coefficients is grouped into sections. While in MPEG-AAC eleven possible codebooks are provided, all spectral coefficients of a section are encoded by the same Huffman codebook.

The encoder will choose one of the eleven possible Huffman codebooks that is particularly suited for encoding the spectral coefficients of the section. By this, the selection of the Huffman codebook of the encoder for a particular section depends on the spectral values of the particular section. The Huffman-encoded spectral coefficients may then be transmitted to the decoder along with side information comprising e.g., information about the Huffman codebook that has been used for encoding a section of a spectral coefficients, a scalefactor that has been used for a particular scalefactor band etc.

Two or four spectral coefficients are encoded by a codeword of the Huffman codebook employed for Huffman-encoding the spectral coefficients of the section. The encoder transmits the codewords representing the encoded spectral coefficients to the decoder along with side information comprising the length of a section as well as information about the Huffman codebook used for encoding the spectral coefficients of the section.

In MPEG AAC, eleven Spectrum Huffman codebooks are provided for encoding spectral data of the audio signal. The different Spectrum Huffman codebook may be identified by their codebook index (a value between 1 and 11). The dimension of the Huffman codebook indicates how many spectral coefficients are encoded by a codeword of the considered Huffman codebook. In MPEG AAC, the dimension of a Huffman codebook is either 2 or 4 indicting that a codeword either encodes two or four spectral values of the audio signal.

However the different Huffman codebooks also differ regarding other properties. For example, the maximum absolute value of a spectral coefficient that can be encoded by the Huffman codebook varies from codebook to codebook and can, for example, be, 1, 2, 4, 7, 12 or greater. Moreover, a considered Huffman codebook may be adapted to encode signed values or not.

Employing Huffman-encoding, the spectral coefficients are encoded by codewords of different lengths. MPEG AAC provides two different Huffman codebooks having an maximum absolute value of 1, two different Huffman codebooks having an maximum absolute value of 2, two different Huffman codebooks having a maximum absolute value of 4, two different Huffman codebooks having an maximum absolute value of 7 and two different Huffman codebooks having an maximum absolute value of 12, wherein each Huffman codebook represents a distinct probability distribution function. The Huffman encoder will choose the Huffman codebook that fits best for encoding the spectral coefficients.

FIG. 8 illustrates a decoder according to the state of the art. Huffman-encoded spectral values are received by a Huffman decoder 750. The Huffman decoder 750 also receives, as side information, information about the Huffman codebook used for encoding the spectral values for each section of spectral values. The Huffman decoder 750 then performs Huffman decoding for obtaining unscaled quantized spectral values. The unscaled quantized spectral values are fed into an inverse quantizer 760. The inverse quantizer performs inverse quantization to obtain inverse-quantized unscaled spectral values, which are fed into a scaler 770. The scaler 770 also receives scalefactors as side information for each scalefactor band. Based on the received scalefactors, the scaler 770 scales the unscaled inverse-quantized spectral values to obtain scaled inverse-quantized spectral values. An F/T filter bank 780 then transforms the scaled inverse-quantized spectral values of the frequency-domain audio signal from the frequency domain to the time domain to obtain sample values of a time-domain audio signal.

FIG. 9 illustrates an encoder according to the state of the art differing from the encoder of FIG. 7 in that the encoder of FIG. 9 further comprises an encoder-side TNS unit (TNS=Temporal Noise Shaping). Temporal Noise Shaping may be employed to control the temporal shape of quantization noise by conducting a filtering process with respect to portions of the spectral data of the audio signal. The encoder-side TNS unit 715 conducts a linear predictive coding (LPC) calculation with respect to the spectral coefficients of the frequency-domain audio signal to be encoded. Inter alia resulting from the LPC calculation are reflection coefficients, also referred to as PARCOR coefficients. Temporal noise shaping is not used if the prediction gain, that is also derived by the LPC calculation, does not exceed a certain threshold value. However, if the prediction gain is greater than the threshold value, temporal noise shaping is employed. The encoder-side TNS unit removes all reflection coefficients that are smaller than a certain threshold value. The remaining reflection coefficients are converted into linear prediction coefficients and are used as noise shaping filter coefficients in the encoder. The encoder-side TNS unit than performs a filter operation on those spectral coefficients, for which TNS is employed, to obtain processed spectral coefficients of the audio signal. Side information indicating TNS information, e.g. the reflection coefficients (PARCOR coefficients) is transmitted to the decoder.

FIG. 10 illustrates a decoder according to the state of the art which differs from the decoder illustrated in FIG. 8 insofar as the decoder of FIG. 10 furthermore comprises a decoder-side TNS unit 775. The decoder-side TNS unit receives inverse-quantized scaled spectra of the audio signal and also received TNS information, e.g., information indicating the reflection coefficients (PARCOR coefficients). The decoder-side TNS unit 775 processes the inversely-quantized spectra of the audio signal to obtain a processed inversely quantized spectrum of the audio signal.

For a plurality of applications, it is important to determine or estimate a level, e.g. energy, amplitude or loudness, of an encoded audio signal. This is particularly true for teleconference systems. Teleconferences, with several participants at different locations, are handled by Multipoint Control Units (MCU). Their aim is to mix the various input and output streams where the audio data is presented in a coded format.

According to the state of the art, all input streams are decoded in the MCU and the audio data is then further analyzed to identify the most dominant streams which are mixed to an output stream. This means that, according to the state of the art, all input streams are Huffman decoded, inverse-quantized and scaled for further analyzing the input streams afterwards to identify the most dominant streams, for example, the streams exhibiting the highest level, e.g. exhibiting the most energy. The state-of-the-art approach for estimating a level, e.g. the energy, of one scalefactor band would be to do the Huffman decoding and inverse quantization for all spectral values and compute the energy by summing up the square of all inversely quantized spectral values.

SUMMARY

According to an embodiment, an apparatus for level estimation of an encoded audio signal may have: a codebook determinator for determining a codebook from a plurality of codebooks as an identified codebook, wherein the audio signal has been encoded by employing the identified codebook, and an estimation unit configured for deriving a level value associated with the identified codebook as a derived level value and, for estimating a level estimate of the audio signal using the derived level value.

According to another embodiment, an apparatus for generating an output data stream from input data may have: a receiver interface for receiving the input data having an encoded audio signal, an apparatus for level estimation of the encoded audio signal as mentioned above, and a decider for deciding, whether a portion of the encoded audio signal is to be included into the output data stream or not, based on the level estimation for the portion of the output data stream.

According to another embodiment, an apparatus for buffer management may have: a buffer access unit for accessing buffer audio data of a buffer as accessed buffer audio data, wherein the buffer audio data has an encoded audio signal, an apparatus for level estimation of the encoded audio signal as mentioned above, and a decider for deciding, whether the accessed buffer audio data is to be deleted from the buffer or not, based on the level estimation of the encoded audio signal.

According to another embodiment, a method for generating a codebook level value associated with a codebook may have the steps of: determining a sequence of number values associated with a codeword of the codebook for each codeword of the codebook, determining an inverse-quantized sequence of number values for each codeword of the codebook by applying an inverse quantizer to the number values of the sequence of number values of a codeword for each codeword of the codebook, determining a sequence of level values for each codeword of the codebook by determining the square of each value of the inverse-quantized sequence of number values of a codeword for each codeword of the codebook when an energy value is to be generated as codebook level value, or by determining a sequence of level values for each codeword of the codebook by determining an absolute value of each value of the inverse-quantized sequence of number values of a codeword for each codeword of the codebook when an amplitude value is to be generated as codebook level value, or by transforming each value of the inverse-quantized sequence of number values of a codeword to a loudness domain for each codeword of the codebook when a loudness value is to be determined as codebook level value, calculating a level sum value for each codeword of the codebook by summing the values of the sequence of level values for each codeword of the codebook, determining a probability-weighted level sum value for each codeword of the codebook by multiplying the level sum value of a codeword by a probability value associated with the codeword for each codeword of the codebook, determining an averaged probability-weighted level sum value for each codeword of the codebook by dividing the probability-weighted level sum value of a codeword by a dimension value associated with the codebook for each codeword of the codebook, and calculating the codebook level value by summing the averaged probability-weighted level sum values of all codewords.

According to another embodiment, a method for level estimation of an encoded audio signal may have the steps of: determining a codebook from a plurality of codebooks as an identified codebook, wherein the audio signal has been encoded by employing the identified codebook, deriving a level value associated with the identified codebook, and estimating a level estimate of the audio signal using the level value.

According to another embodiment, a method for generating an output data stream from input data may have the steps of: receiving the input data having an encoded audio signal, determining a codebook from a plurality of codebooks as an identified codebook, wherein the audio signal has been encoded by employing the identified codebook, deriving a level value associated with the identified codebook, estimating a level estimate of the audio signal using the level value, and deciding, whether a portion of the encoded audio signal is to be included into the output data stream or not, based on the level estimate for the portion of the output data stream.

According to another embodiment, a method for storing input data having an encoded audio signal in a buffer may have the steps of: receiving the input data having the encoded audio signal, determining a codebook from a plurality of codebooks as an identified codebook, wherein the audio signal has been encoded by employing the identified codebook, deriving a level value associated with the identified codebook, estimating a level estimate of the audio signal using the level value, and deciding, whether a portion of the encoded audio signal is to be stored in the buffer or not, based on the level estimation for the portion of the output data stream.

Another embodiment may have a computer program implementing the methods as mentioned above when being executed by a computer or a signal processor.

In an embodiment, the derived level value may be a derived energy value, and the apparatus for level estimation may be adapted for conducting an energy estimation as level estimation. In another embodiment, the derived level value may be a derived amplitude value, and the apparatus for level estimation may be adapted for conducting an amplitude estimation as level estimation. In a further embodiment, the derived level value may be a derived loudness value and the apparatus for level estimation may be adapted for conducting a loudness estimation as level estimation.

The present invention is based on the finding that in order to reduce the complexity for all decoding steps, the level, e.g. the energy, the amplitude or the loudness, can be estimated directly from the bitstream parameters for identification of the most dominant streams. Level estimation, e.g., energy estimation, amplitude estimation or loudness estimation, may be based on bitstream information, for example, bit stream elements, e.g., Huffman codebook, scalefactor and, for example, TNS filter coefficients. These bitstream elements may be used to estimate the level of an according AAC-ELD stream (AAC-ELD; Advanced Audio Coding-Enhanced Low Delay). Thus, according to the present invention, it is not necessary to fully decode an audio bit stream but instead, by providing a level estimation based on the determination of a codebook that has been employed for encoding the audio signal, by deriving a level value associated with the identified codebook, and by estimating a level estimate of the audio signal using the level value.

In an embodiment, the estimation unit comprises a scaling unit. The scaling unit may be adapted to derive a scalefactor relating to the encoded audio signal or to a portion of the encoded audio signal as a derived scalefactor. The scaling unit may be adapted to obtain a scaled level value, e.g. a scaled energy, amplitude or loudness value, based on the scalefactor and the derived level value. Moreover, the estimation unit may be adapted to estimate a level estimate of the audio signal using the scaled level value. According to this embodiment, the level estimate is provided based on information about the codebook that has been used for encoding the audio signal, a level value that is associated with the identified codebook and a scalefactor.

In an embodiment, the derived level value is an energy value, and the scaling unit is adapted to apply the derived scalefactor on the derived energy value to obtain a scaled energy value by multiplying the derived energy value by the square of the derived scalefactor. By this, the derived scalefactor is applied on the derived energy in a similar way as the scalefactor is applied on the unscaled inverse-quantized spectral coefficients in the decoder according to MPEG-2 AAC, but without the necessity to decode the spectral coefficients.

In another embodiment, the derived level value is an amplitude value, and the scaling unit is adapted to apply the derived scalefactor on the derived amplitude value to obtain a scaled amplitude value by multiplying the derived amplitude value by the derived scalefactor.

In a further embodiment, the derived level value is a loudness value, and the scaling unit is adapted to apply the derived scalefactor on the derived loudness value to obtain a scaled loudness value by multiplying the derived loudness value by the cube of the derived scalefactor. There exist alternative ways to calculate the loudness such as by an exponent 3/2. Generally, the scalefactors have to be transformed to the loudness domain, when the derived level value is a loudness value.

In another embodiment, the estimation unit is configured for estimating a level estimate of the audio signal using a particular level value as derived level value. Thus, the estimation unit is particularly configured for conducting the level estimate based on the particular kind of level value.

In an embodiment, the derived level value is a derived energy value, and the estimation unit is configured for estimating an energy estimate as level estimate of the audio signal using as the derived energy value a codebook energy value, which indicates a sum of averaged probability-weighted energy sum values of all codewords of the identified codebook. Each average probability-weighted sum value indicates a ratio of a probability-weighted energy sum value of a codeword of the identified codebook by a dimension value associated with the codebook. Each probability-weighted energy sum value indicates a product of an energy sum value of a considered codeword of the identified codebook by a probability value associated with the considered codeword of the identified codebook. Each energy sum value indicates number values of a sequence of energy values of a codeword of the identified codebook. Each sequence of energy values indicates a square value for each value of a sequence of inverse quantized number values of a sequence of number values of a codeword for each codeword of the codebook. Each sequence of number values is a sequence of number values encoded by a codeword of the codebook.

In a further embodiment, the estimation unit further comprises a level value deriver. The level value deriver is adapted to derive the derived level value by looking up the level value associated with the identified codebook in a memory. In an alternative embodiment, the level value deriver is adapted to request the level value associated with the identified codebook from a local database. In another further embodiment, the level value deriver is adapted to request the level value associated with the identified codebook from a remote computer.

In another embodiment, the apparatus further comprises a memory or a database having stored therein a plurality of codebook level memory values indicating a level value being associated with a codebook, wherein each one of the plurality of codebooks has a codebook level memory value associated with it and stored in the memory or the database. The level value deriver is configured for deriving the level value associated with the identified codebook by deriving a codebook level memory value associated with the identified codebook for the memory or from the database.

In an embodiment, the memory or the database has stored therein a plurality of codebook energy memory values as codebook memory level values, wherein each codebook energy memory value indicates a sum of averaged probability-weighted energy sum values of all codewords of the identified codebook. Each energy sum value indicates number values of a sequence of energy values of a codeword of the identified codebook. Furthermore, each sequence of energy values indicates a square value for each value of a sequence of inverse quantized number values of a sequence of number values of a codeword for each codeword of the codebook. Each sequence of number values is a sequence of number values stored by a codeword of the codebook. This embodiment provides a memory or a database having stored therein a plurality of codebook energy memory values being associated with a particular codebook wherein the stored codebook energy memory values have special properties which are particularly suitable for being used for energy estimation.

In another embodiment, the memory or the database has stored therein a plurality of amplitude values as codebook memory level values. In a further embodiment, the memory or the database has stored therein a plurality of loudness values as codebook memory level values.

In another embodiment, the estimation unit further comprises a prediction filter adjuster. The prediction filter adjuster is adapted to derive one or more prediction filter coefficients relating to the encoded audio signal or to a portion of the encoded audio signal as derived prediction filter coefficients. The prediction filter adjuster is furthermore adapted to obtain a prediction-filter-adjusted level value based on the prediction filter coefficients and the derived level value. Moreover, the estimation unit is adapted to estimate a level estimate of the audio signal using the prediction-filter-adjusted level value.

According to another embodiment, an apparatus for generating a back data stream for a plurality of participants in a teleconferencing system is provided. The apparatus comprises a receiver interface for receiving a plurality of participant data streams comprising audio signals from the plurality of participants. Moreover, the apparatus for generating a back data stream comprises an apparatus for level estimation of an encoded audio signal according to one of the above-described embodiments. The apparatus for level estimation is arranged for conducting a level estimation for each participant data stream without fully decoding the data stream. Furthermore, the apparatus for generating a back data stream comprises a decider for deciding whether or not a participant data stream is to be included into the back data stream based on the level estimation. Moreover, the apparatus for generating a back data stream comprises a mixer for only mixing the participant data streams to be included in the back data stream and for not including the participant data streams decided to be not included. The apparatus for generating a back data stream is configured to not fully decode the participant data streams decided to be not included in the back data stream. In an embodiment, the decider is adapted to decide that a considered participant data stream is not included in the back data stream when the level estimation of the considered participant data stream is below a threshold value. In a further embodiment, the decider is adapted to decide that the only data stream that is included in the back data stream is the data stream having the highest level estimation of the level estimations of all participant data streams regarding a particular scalefactor band.

According to an embodiment, a method for generating a level value associated with a codebook is provided. The method comprises: Determining a sequence of number values associated with a codeword of the codebook for each codeword of the codebook. Determining an inverse-quantized sequence of number values for each codeword of the codebook by applying an inverse quantizer to the number values of the sequence of number values of a codeword for each codeword if the codebook. Calculating a sequence of level values for each codeword of the codebook by squaring each value of the inverse-quantized sequence of number values of a codeword for each codeword of the codebook. Calculating a level sum value for each codeword of the codebook by summing the values of the sequence of level values for each codeword of the codebook. Determining a probability-weighted level sum value for each codeword of the codebook by multiplying the level sum value of a codeword by a probability value associated with the codeword for each codeword of the codebook. Determining an average probability-weighted level sum value for each codeword of the codebook by dividing the probability-weighted level sum value of a codeword by a dimension value associated with the codebook for each codeword of the codebook and calculating the level value of the codebook by summing the average probability-weighted level sum value of all codewords.

BRIEF DESCRIPTION OF THE DRAWINGS

Embodiments of the present invention will be detailed below with reference to the drawings, in which.

DETAILED DESCRIPTION OF THE INVENTION

Figure 1:
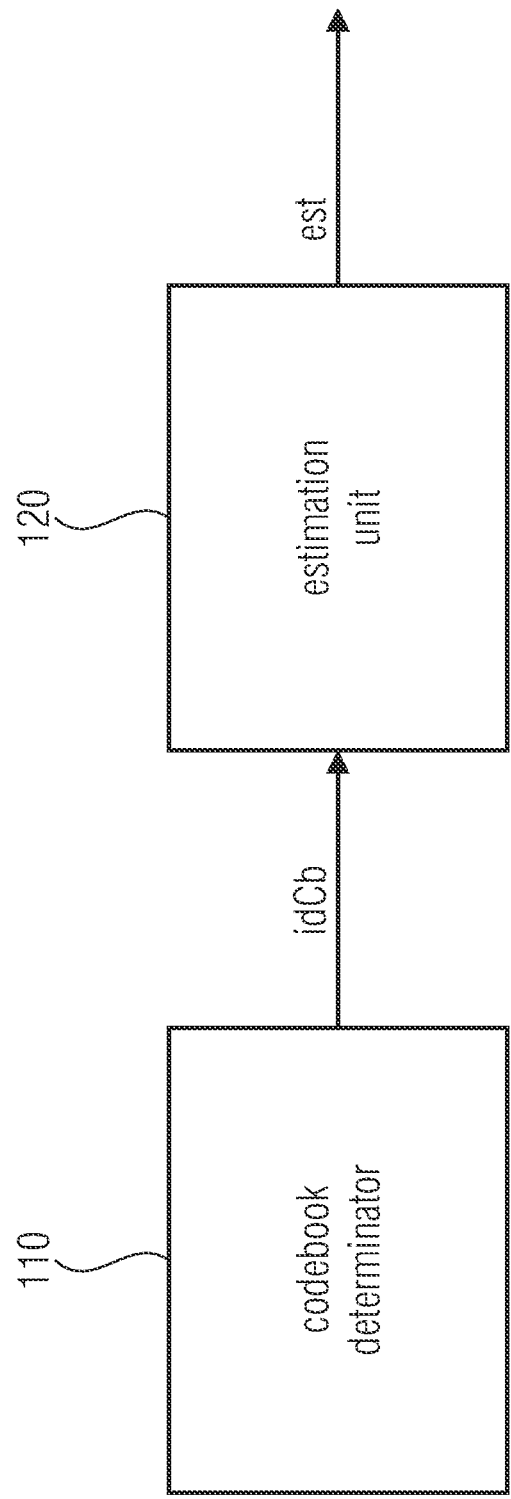
FIG. 1 depicts an apparatus for level estimation according to an embodiment.

FIG. 1 illustrates an apparatus according to an embodiment. The apparatus comprises a codebook determinator 110 and an estimation unit 120. The codebook determinator 110 is adapted to determine a codebook from a plurality of codebooks as an identified codebook, wherein the audio signal has been encoded by employing the identified codebook. The estimation unit 120 is adapted to derive a level value, e.g. an energy value, an amplitude value or a loudness value, associated with the identified codebook as a derived level value. Moreover, the estimation unit 120 is adapted to estimate a level estimate, e.g. an energy estimate, an amplitude estimate or a loudness estimate, of the audio signal using the derived level value. For example, the codebook determinator 110 may determine the codebook, that has been used by an encoder for encoding the audio signal, by receiving side information transmitted along with the encoded audio signal. In particular, the side information may comprise information identifying the codebook used for encoding a considered section of the audio signal. Such information may, for example, be transmitted from the encoder to the decoder as a number, identifying a Huffman codebook used for encoding the considered section of the audio signal.

Figure 2:
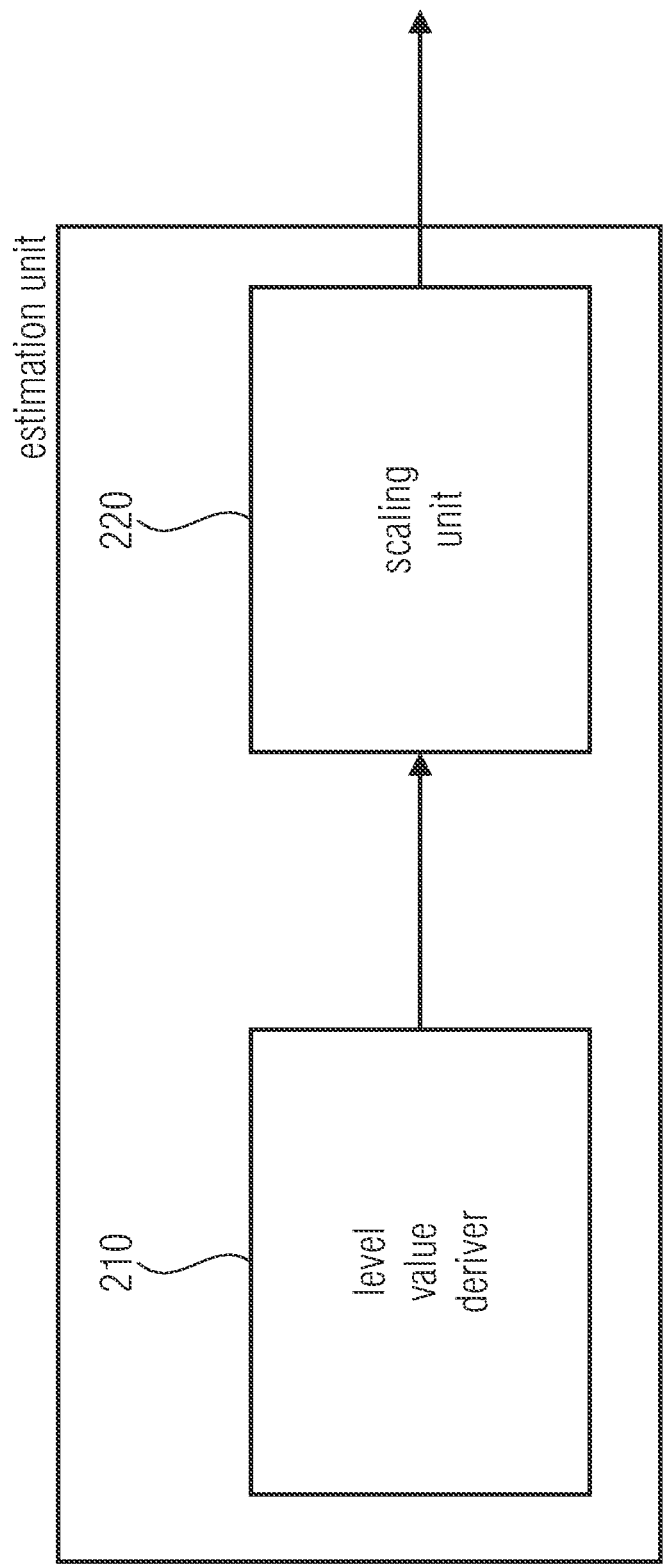
FIG. 2 illustrates an estimation unit according to an embodiment.

FIG. 2 illustrates an estimation unit according to an embodiment. The estimation unit comprises a level value deriver 210 and a scaling unit 220. The level value deriver is adapted to derive a level value associated with the identified codebook, i.e., the codebook that was used for encoding the spectral data by the encoder, by looking up the level value in a memory, by requesting the level value from a local database or by requesting the level value associated with the identified codebook from a remote computer. In an embodiment, the level value, that is looked-up or requested by the level value deriver, may be an average level value that indicates an average level of an encoded unscaled spectral value encoded by using the identified codebook.

By this, the derived level value is not calculated from the actual spectral values but instead, an average level value is used that depends only on the employed codebook. As has been explained before, the encoder is generally adapted to select the codebook from a plurality of codebooks that fit best to encode the respective spectral data of a section of the audio signal. As the codebooks differ, for example with respect to their maximum absolute value that can be encoded, the average value that is encoded by a Huffman codebook differs from codebook to codebook and, therefore, also the average level value of an encoded spectral coefficient encoded by a particular codebook differs from codebook to codebook.

Thus, according to an embodiment, an average level value for encoding a spectral coefficient of an audio signal employing a particular Huffman codebook can be determined for each Huffman codebook and can, for example, can be stored in a memory, a database or on a remote computer. The level value deriver then simply has to look-up or request the level value associated with the identified codebook that has been employed for encoding the spectral data, to obtain the derived level value associated with the identified codebook.

However, it has to be taken into consideration that Huffman codebooks are often employed to encode unscaled spectral values, as it is the case for MPEG AAC. Then, however, scaling should be taken into account when a level estimate is conducted. Therefore, the estimation unit of FIG. 2 also comprises a scaling unit 220. The scaling unit is adapted to derive a scalefactor relating to the encoded audio signal or to a portion of the encoded audio signal as a derived scalefactor. For example, with respect to a decoder, the scaling unit 220 will determine a scalefactor for each scalefactor band. For example, the scaling unit 220 may receive information about the scalefactor of a scalefactor band by receiving side information transmitted from an encoder to the decoder. The scaling unit 220 is furthermore adapted to determine a scaled level value based on the scalefactor and the derived level value.

In an embodiment, where the derived level value is a derived energy value, the scaling unit is adapted to apply the derived scalefactor on the derived energy value to obtain a scaled level value by multiplying derived energy value by the square of the derived scalefactor.

In another embodiment, where the derived level value is a derived amplitude value, and the scaling unit is adapted to apply the derived scalefactor on the derived amplitude value to obtain a scaled level value by multiplying derived amplitude value by the derived scalefactor.

In a further embodiment, wherein the derived level value is a derived loudness value, and the scaling unit (220) is adapted to apply the derived scalefactor on the derived loudness value to obtain a scaled level value by multiplying derived loudness value by the cube of the derived scalefactor. There exist alternative ways to calculate the loudness such as by an exponent 3/2. Generally, the scalefactors have to be transformed to the loudness domain, when the derived level value is a loudness value.

These embodiments take into account, that an energy value is determined based on the square of the spectral coefficients of an audio signal, that an amplitude value is determined based on the absolute values of the spectral coefficients of an audio signal, and that a loudness value is determined based on the spectral coefficients of an audio signal that have been transformed to the loudness domain.

Figure 3:
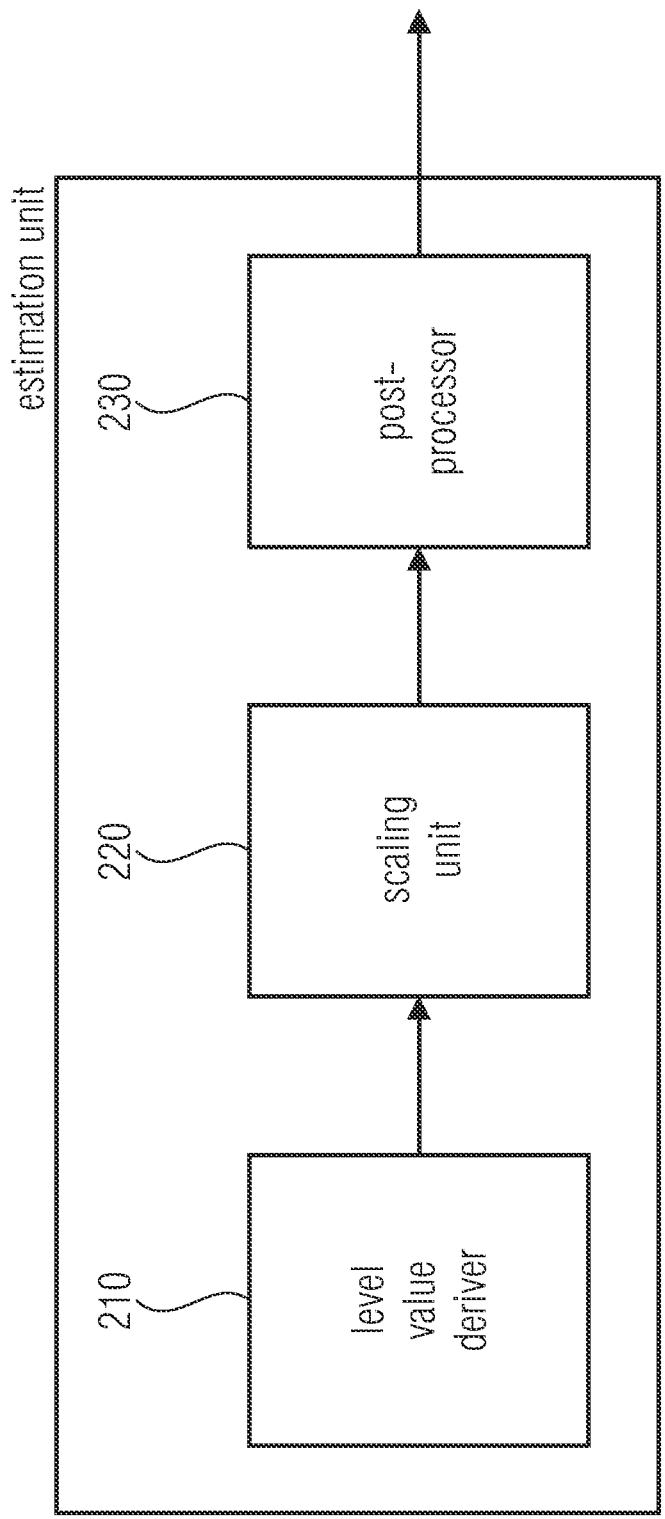
FIG. 3 shows an estimation unit according to another embodiment.

The estimation unit is adapted to estimate a level estimate of the audio signal using the scaled level value. In the embodiment of FIG. 2, the estimation unit is adapted to output the scaled level value as the level estimate. In this case, no post-processing of the scaled level value is conducted. However, as illustrated in the embodiment of FIG. 3, the estimation unit may also be adapted to conduct a post-processing. Therefore, the estimation unit of FIG. 3 comprises a post-processor 230 for post-processing one or more scaled level values for estimating a level estimate. For example, the level estimate of the estimation unit may be determined by the post-processor 230 by determining an average value of a plurality of scaled level values. This averaged value may be outputted by the estimation unit as level estimate.

In contrast to the presented embodiments, a state-of-the-art approach for estimating e.g. the energy of one scalefactor band would be to do the Huffman decoding and inverse quantization for all spectral values and compute the energy by summing up the square of all inversely quantized spectral values.

In the proposed embodiments, however, this computationally complex process of the state-of-the-art is replaced by an estimate of the average level which only depends on the scalefactor and the codebook uses and not on the actual quantized values.

Embodiments of the present invention employ the fact that a Huffman codebook is designed to provide optimal coding following a dedicated statistic. This means the codebook has been designed according to the probability of the data, e.g., AAC-ELD (AAC-ELD=Advanced Audio Coding-Enhanced Low Delay): spectral lines. This process can be inverted to get the probability of the data according to the codebook. The probability of each data entry inside a codebook (index) is given by the length of the codeword. For example, $$p(\text{index})=2\text{\textasciicircum}-\text{length}(\text{codeword})$$

i.e.

$$p(\text{index})=2^{-length(codeword)}$$

wherein p(index) is the probability of a data entry (an index) inside a codebook.

Based on this, the expected level can be pre-computed and stored in the following way: each index represents a sequence of integer values (x), e.g., spectral lines, where the length of the sequence depends on the dimension of the codebook, e.g., 2 or 4 for AAC-ELD.

Figure 4A:
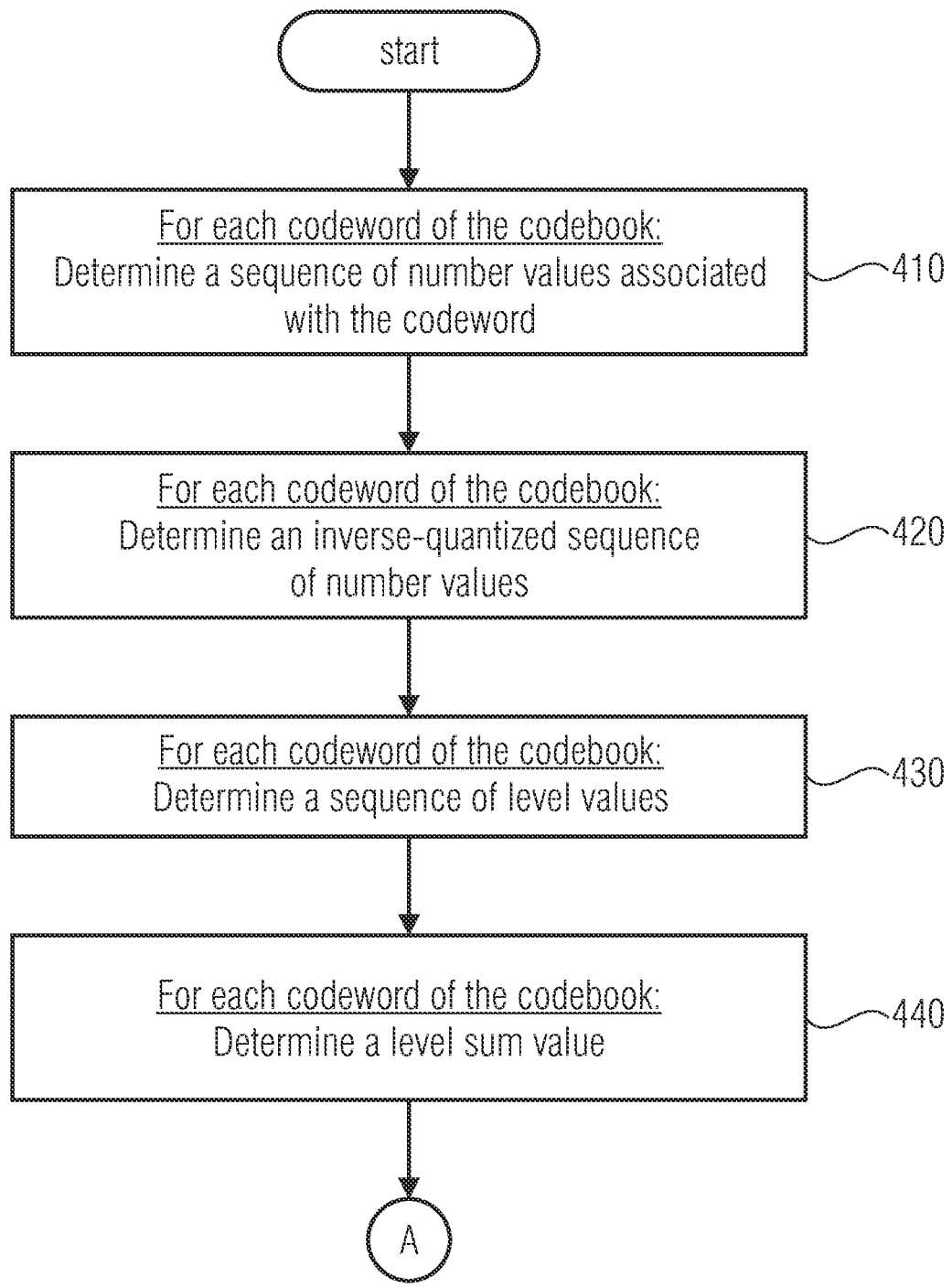
FIGS. 4a and 4b illustrate a method for generating a level value.
Figure 4B:
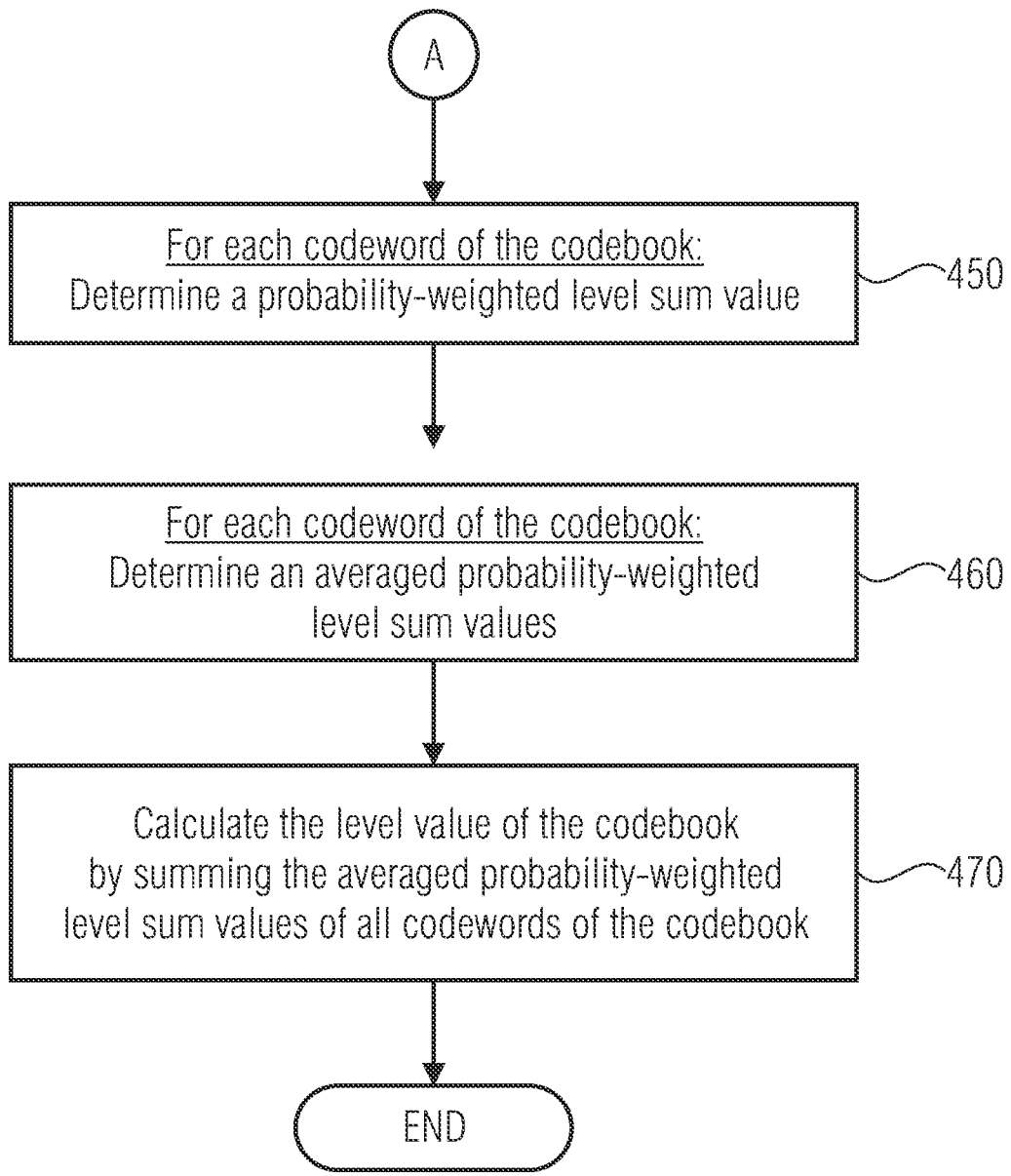

FIGS. 4a and 4b illustrate a method for generating a level value, e.g. an energy value, an amplitude value or a loudness value, associated with a codebook according to an embodiment. The method comprises:

Determining a sequence of number values associated with a codeword of the codebook for each codeword of the codebook (step 410). As has been explained before, a codebook encodes a sequence of number values, for example, 2 or 4 number values by a codeword of the codebook. The codebook comprises a plurality of codebooks to encode a plurality of sequences of number values. The sequence of number values, that is determined, is the sequence of number values that is encoded by the considered codeword of the codebook. The step 410 is conducted for each codeword of the codebook. For example, if the codebook comprises 81 codewords, 81 sequences of number values are determined in step 410.

In step 420, an inverse-quantized sequence of number values is determined for each codeword of the codebook by applying an inverse quantizer to the number values of the sequence of number values of a codeword for each codeword of the codebook. As has been explained before, an encoder may generally employ quantization when encoding the spectral values of the audio signal, for example non-linear quantization. As a consequence, this quantization has to be inverted on a decoder side.

Afterwards, in step 430, a sequence of level values is determined for each codeword of the codebook.

If an energy value is to be generated as the codebook level value, then a sequence of energy values is determined for each codeword, and the square of each value of the inverse-quantized sequence of number values is calculated for each codeword of the codebook.

If, however, an amplitude value is to be generated as the codebook level value, then a sequence of amplitude values is determined for each codeword, and the absolute value of each value of the inverse-quantized sequence of number values is calculated for each codeword of the codebook.

If, though, a loudness value is to be generated as the codebook level value, then a sequence of loudness values is determined for each codeword, and the cube of each value of the inverse-quantized sequence of number values is calculated for each codeword of the codebook. There exist alternative ways to calculate the loudness such as by an exponent 3/2. Generally, the values of the inverse-quantized sequence of number values have to be transformed to the loudness domain, when a loudness value is to be generated as the codebook level value.

Subsequently, in step 440, a level sum value for each codeword of the codebook is calculated by summing the values of the sequence of level values for each codeword of the codebook.

Then, in step 450, a probability-weighted level sum value is determined for each codeword of the codebook by multiplying the level sum value of a codeword by a probability value associated with the codeword for each codeword of the codebook. By this, it is taken into account that some of the sequence of number values, e.g., sequences of spectral coefficients, will not appear as often as other sequences of spectral coefficients. The probability value associated with the codeword takes this into account. Such a probability value may be derived from the length of the codeword, as codewords that are more likely to appear are encoded by using codewords having a shorter length, while other codewords that are more unlikely to appear will be encoded by using codewords having a longer length, when Huffman-encoding is employed.

In step 460, an averaged probability-weighted level sum value for each codeword of the codebook will be determined by dividing the probability-weighted level sum value of a codeword by a dimension value associated with the codebook for each codeword of the codebook. A dimension value indicates the number of spectral values that are encoded by a codeword of the codebook. By this, an averaged probability-weighted level sum value is determined that represents a level value (probability-weighted) for a spectral coefficient that is encoded by the codeword.

Then, in step 470, the level value of the codebook is calculated by summing the averaged probability-weighted level sum values of all codewords.

It has to be noted, that such a generation of a level value does only have to be done once for a codebook. If the level value of a codebook is determined, this value can simply be looked-up and used, for example by an apparatus for level estimation according to the embodiments described above.

In the following, a method for generating an energy value associated with a codebook according to an embodiment is presented. In order to estimate the expected value of the energy of the data coded with the given codebook, the following steps have to be performed only once for each index of the codebook:

A) apply the inverse quantizer to the integer values of the sequence (e.g. AAC-ELD: $x^{(4/3)}$)
B) calculate energy by squaring each value of the sequence of A)
C) build the sum of the sequence of B)
D) multiply C) with the given probability of the index
E) divide by the dimension of the codebook to get the expected energy per spectral line.

Finally, all values calculated by E) have to be summed-up to get the expected energy of the complete codebook.

After the output of these steps is stored in a table, the estimated energy values can be simply looked-up based on the codebook index, i.e., depending on which codebook is used. The actual spectral values do not have to be Hoffman-decoded for this estimation.

To estimate the overall energy of the spectral data of a complete audio frame, the scalefactor has to be taken into account. The scalefactor can be extracted from the bit stream without a significant amount of complexity. The scalefactor may be modified before being applied on the expected energy, e.g. the square of the used scalefactor may be calculated. The expected energy is then multiplied with the square of the used scalefactor.

According to the above-described embodiments, the spectral level for each scalefactor band can be estimated without decoding the Huffman coded spectral values. The estimates of the level can be used to identify streams with a low level, e.g. with low power, which are not relevant for a subsequent mixing process. Therefore, the full decoding of such streams can be avoided.

According to an embodiment, an apparatus for level estimation further comprises a memory or a database having stored therein a plurality of codebook level memory values indicating a level value being associated with a codebook, wherein each one of the plurality of codebooks has a codebook level memory value associated with it stored in the memory or database. Furthermore, the level value deriver is configured for deriving the level value associated with the identified codebook by deriving a codebook level memory value associated with the identified codebook from the memory or from the database.

The level estimated according to the above-described embodiments can vary if a further processing step as prediction, such as prediction filtering, are applied in the codec, e.g., for AAC-ELD TNS (Temporal Noise Shaping) filtering. Here, the coefficients of the prediction are transmitted inside the bit stream, e.g., for TNS as PARCOR coefficients.

Figure 5:
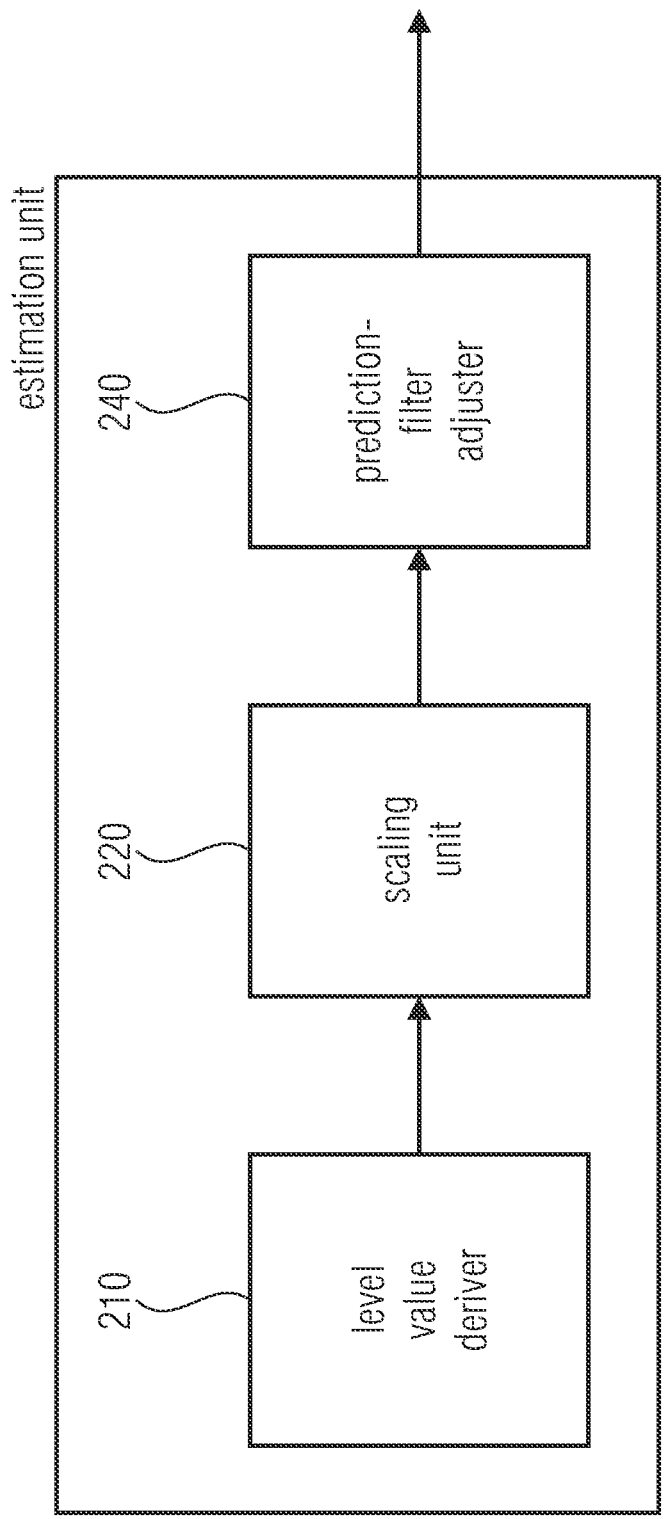
FIG. 5 depicts an estimation unit according to a further embodiment comprising a prediction filter adjuster.

FIG. 5 illustrates an embodiment wherein the estimation unit further comprises a prediction filter adjuster 240. The prediction filter adjuster is adapted to derive one or more prediction filter coefficients relating to the encoded audio signal or to a portion of the encoded audio signal as derived prediction filter coefficients. Moreover, the prediction filter adjuster is adapted to obtain a prediction-filter-adjusted level value based on the prediction filter coefficients and the derived level value. Furthermore, the estimation unit is adapted to estimate a level estimate of the audio signal using the prediction-filter-adjusted level value.

In an embodiment, the PARCOR coefficients for TNS are used as a prediction filter coefficients. The prediction gain of the filtering process can be determined from those coefficients in a very efficient way. Regarding TNS, the prediction gain can be calculated according to the formula: gain=1/ prod(1−parcor.^2).

For example, if 3 PARCOR coefficients, e.g., parcor$_1$, parcor$_2$ and parcor$_3$ have to be taken into consideration, the gain is calculated according to the formula:

$$\text{gain} = \frac{1}{(1 - parcor_1^2)(1 - parcor_2^2)(1 - parcor_3^2)}$$

For n PARCOR coefficients parcor$_1$, parcor$_2$, ... parcor$_n$, the following formula applies:

$$\text{gain} = \frac{1}{(1 - parcor_1^2)(1 - parcor_2^2) \ldots (1 - parcor_n^2)}$$

This means that the amplification of the audio signal through the filtering can be estimated without applying the filtering operation itself.

An apparatus for level estimation according to one of the above-described embodiments may be employed for teleconference systems, e.g., for a Multipoint Control Unit (MCU).

Figure 6:
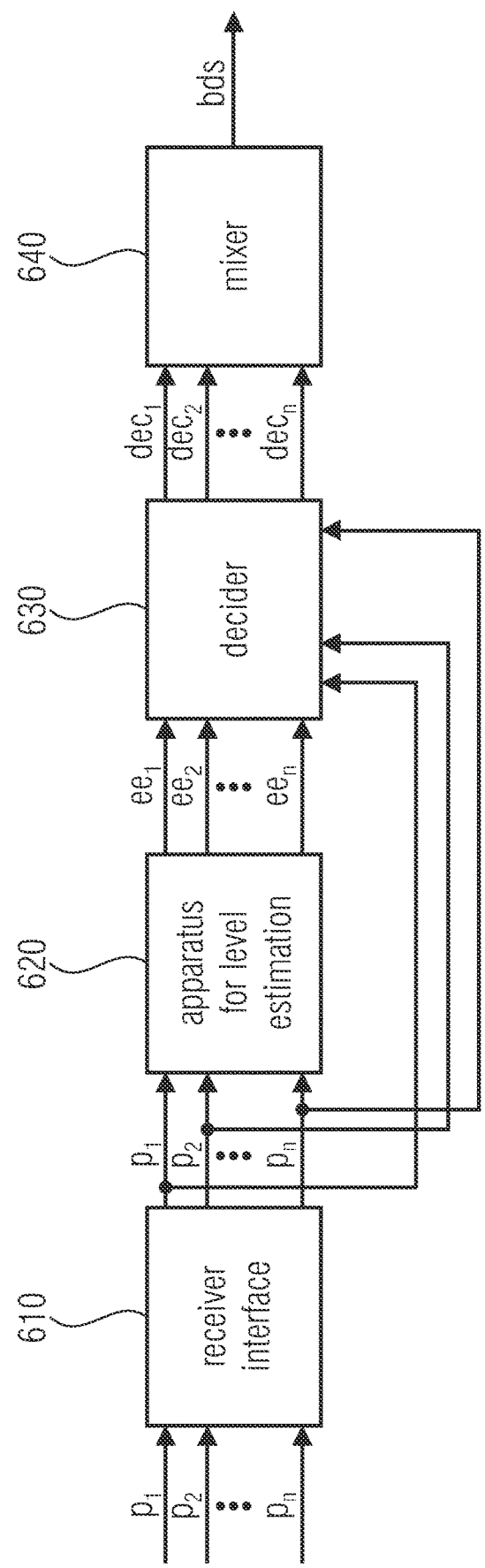
FIG. 6 illustrates an apparatus for generating a back data stream.
Figure 7:
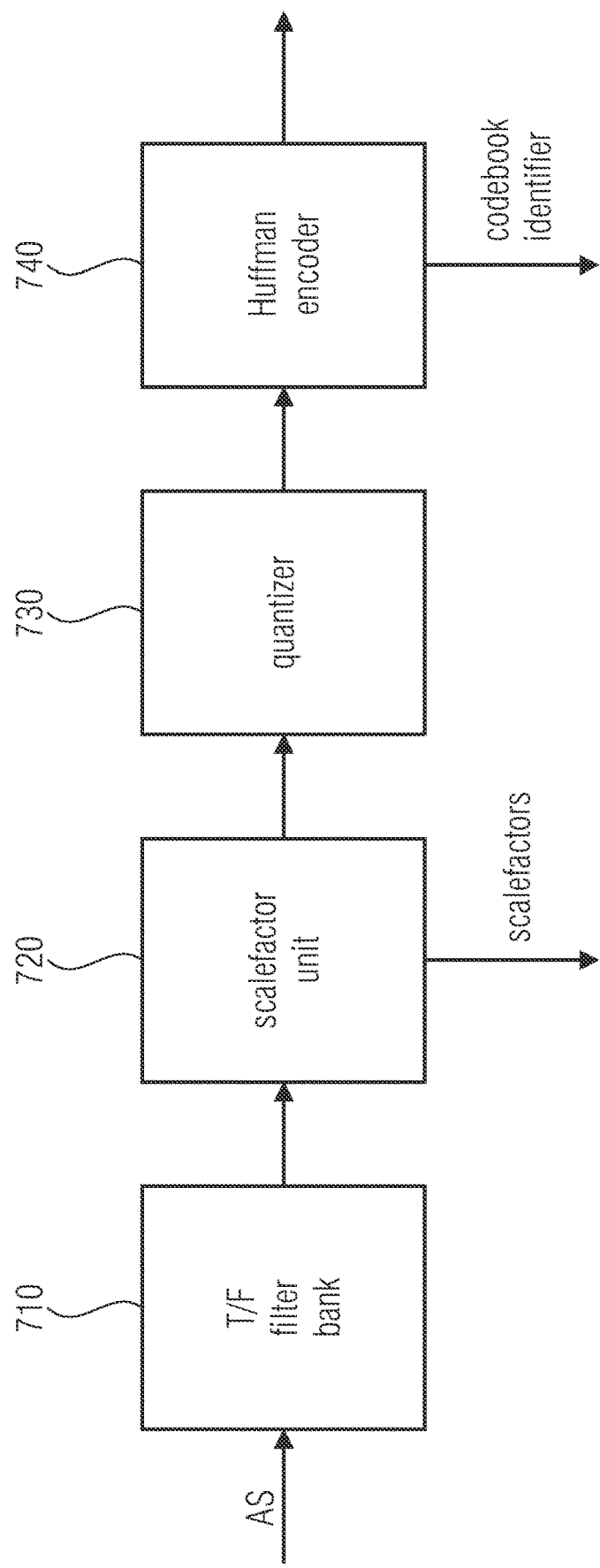
FIG. 7 illustrates an encoder according to the state of the art.
Figure 8:
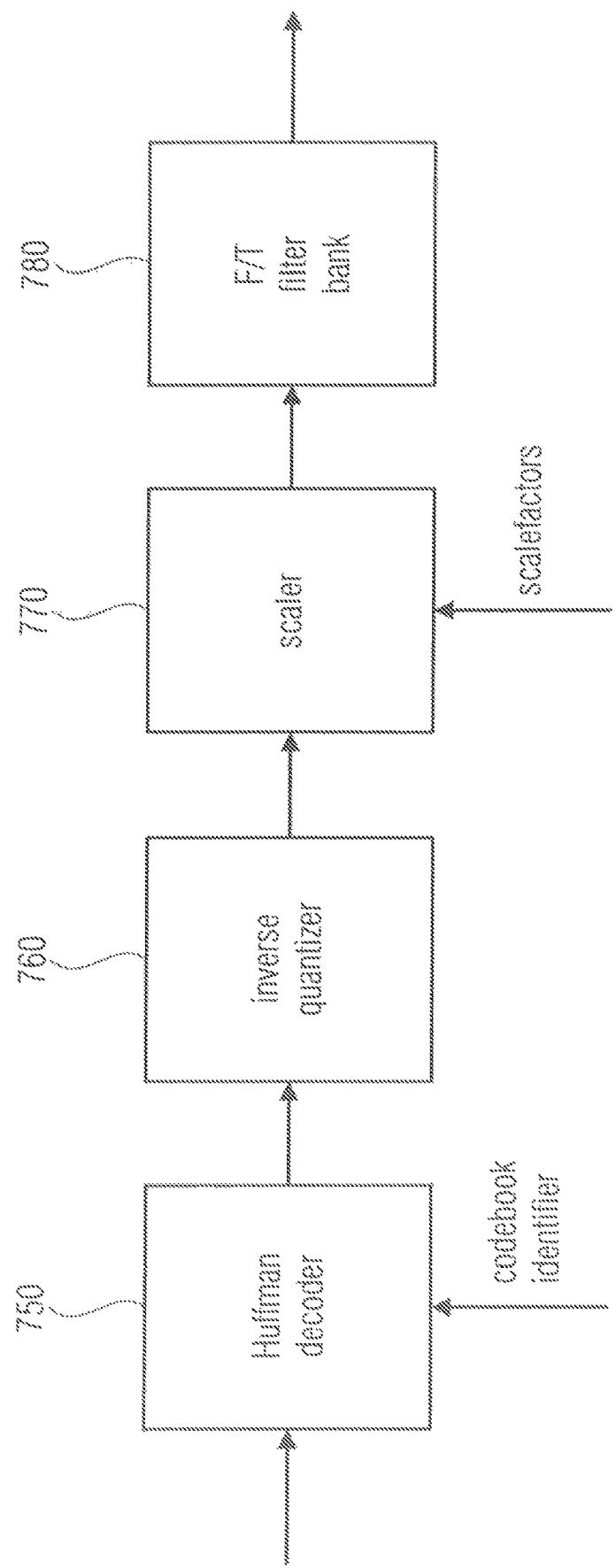
FIG. 8 depicts a decoder according to the state of the art.
Figure 9:
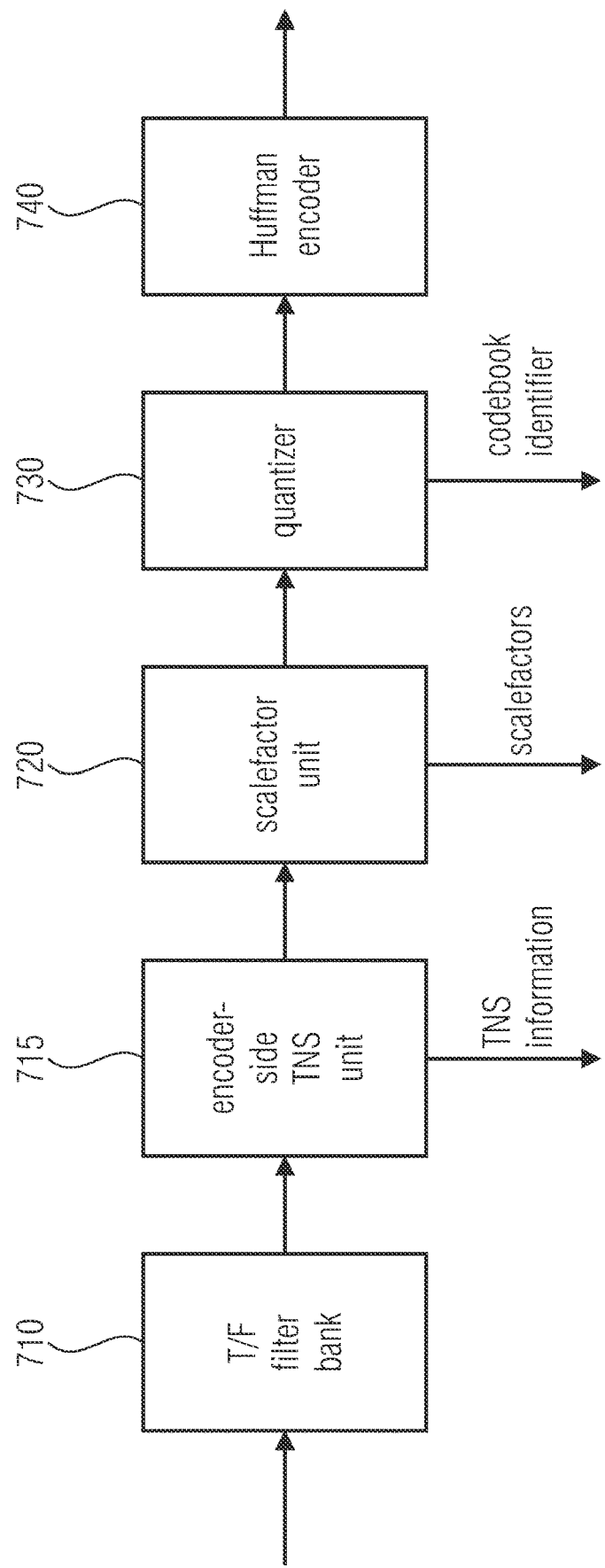
FIG. 9 illustrates another encoder according to the state of the art.
Figure 10:
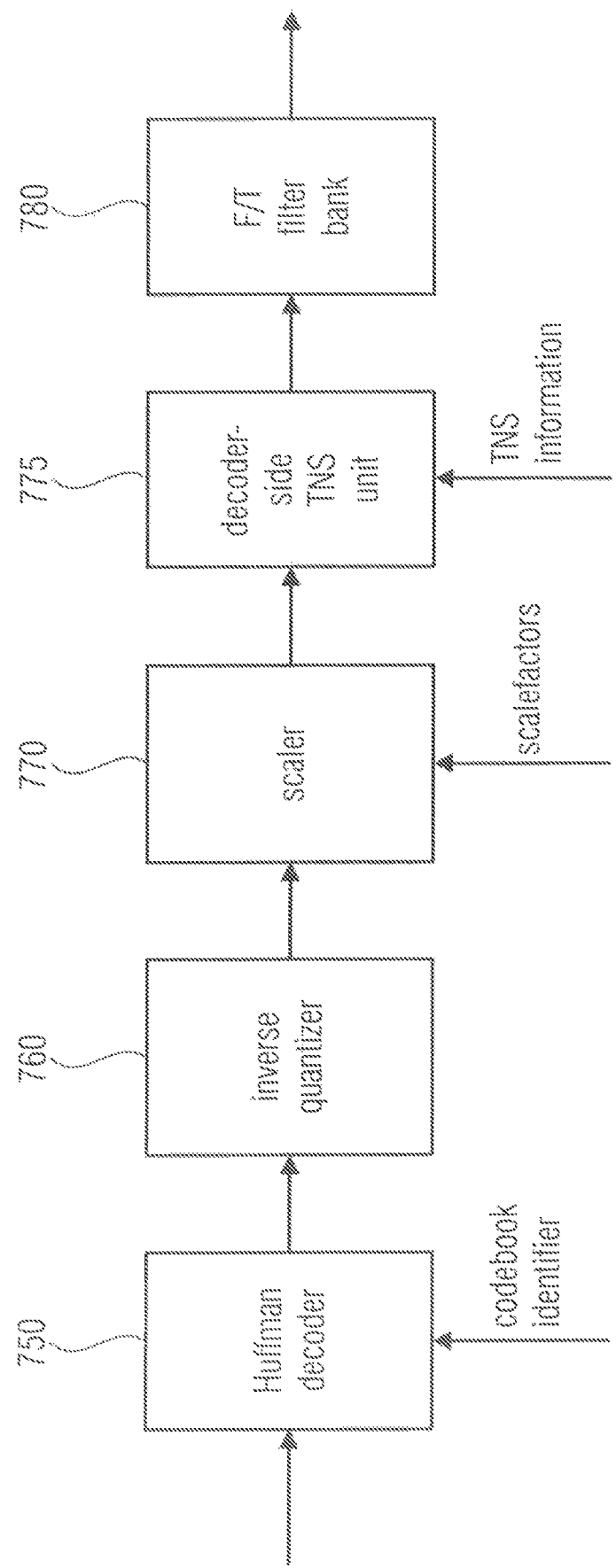
FIG. 10 depicts a further decoder according to the state of the art.

FIG. 6 illustrates an apparatus for generating a back data stream for a plurality of participants in a teleconference system according to an embodiment. The apparatus comprises a receiver interface 610 for receiving a plurality of participant data streams p1, p2, ... pn. The participant data streams p1, p2, ... pn comprises audio signals from the plurality of participants. Furthermore, the apparatus for generating a back data stream comprises an apparatus 620 for level estimation of an encoded audio signal according to one of the above-described embodiments, wherein the apparatus 620 for level estimation is arranged for conducting a level estimation for each participant data stream without fully decoding the data stream. As illustrated in FIG. 6, the apparatus for level estimation receives the audio data streams p1, p2, ... pn and conducts a level estimation for each of the received audio data streams p1, p2, ... pn comprising audio signals. The apparatus 620 delivers level estimation ee$_1$, ee$_2$, ... ee$_n$ relating to the audio data streams p1, p2, ... pn to a decider 630. The decider 630 is adapted for deciding whether a participant data stream is to be included into the back data stream or not based on the level estimation for each participant data stream. The decider 530 then delivers a decision dec$_1$, dec$_2$, ..., dec$_n$, as to whether a particular data stream p1, p2, ... pn is included into the back data stream or not to a mixer 640 for each participant data stream. The mixer 640 is also adapted to receive the participant data streams p1, p2, ... pn. Based on the decisions dec$_1$, dec$_2$, ... dec$_n$, the mixer 640 only mixes the participant data streams to be included in the back data stream and does not include the participant data streams decided to not be included.

The apparatus for generating a back data stream is configured to not fully decode the participant data streams decided to be not included in the back data stream.

In an embodiment, the decider 630 is adapted to decide that a considered participant data stream is not included in the back data stream when the level estimation of the considered participant data stream is below a threshold value.

In an embodiment, the apparatus for generating a back data stream is adapted to decide on a frame-by-frame basis, whether a participant data stream is to be included into the back data stream or not, e.g. it is decided for each audio frame, whether the whole audio frame of the participant data stream is to be included into the back data stream or not.

In an alternative embodiment, the apparatus for generating a back data stream is adapted to decide on a scalefactor band basis, whether a participant data stream is to be included into the back data stream or not, e.g. for different scalefactor bands of an audio frame, the decision, whether a scalefactor band is included into the back data stream may be different.

In a further embodiment, the decider 630 is adapted to decide that the only data stream that is included in the back data stream is the data stream having the highest level estimation of the level estimations of all participant data streams regarding a particular scalefactor band.

In another embodiment, the decider 630 is adapted to decide that the only two data streams that are included in the back data stream are the data streams having the two highest level estimations of the level estimations of all participant data streams regarding a particular scalefactor band.

In an alternative embodiment, the apparatus for level estimation 620 in FIG. 6 is not a single apparatus for level estimation which estimates a level estimate for each one of the audio signals but instead the apparatus 620 comprises a plurality of n apparatuses for level estimation, each apparatus for level estimation providing a level estimate for one of the n audio signal streams.

The apparatus for level estimation is also applicable for a variety of other applications. In an embodiment, an apparatus for buffer management is provided. The apparatus for buffer management comprises a buffer access unit for accessing buffer audio data of a buffer as accessed buffer audio data, wherein the buffer audio data comprises an encoded audio signal. Moreover, the apparatus for buffer management comprises an apparatus for level estimation of the encoded audio signal according to one of the above embodiments. Furthermore, the apparatus for buffer management comprises a decider for deciding, whether the accessed buffer audio data is to be deleted from the buffer or not, based on the level estimation of the encoded audio signal.

Such an apparatus for buffer management is particularly useful for managing a jitter buffer, e.g. employed for VoIP (Voice over Internet Protocol). An apparatus for buffer management according an embodiment is adapted to keep important audio frames in the buffer, and is adapted to delete less important frames from the buffer, when the buffer is in a state that the danger of buffer overrun exists. For example, the whole audio data content of a buffer might be examined and the apparatus for buffer management decides, whether audio data content (buffer audio data) is to be deleted from the buffer or not, based on the level estimation.

In an embodiment, the apparatus for storing input data is adapted to decide, whether audio data will be stored or discarded, on a frame-by-frame basis, e.g. it is decided for each audio frame, whether the whole audio frame is stored or discarded.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for level estimation of an encoded audio signal, comprising:
   a codebook determinator for determining a codebook from a plurality of codebooks as an identified codebook, wherein the audio signal has been encoded by employing the identified codebook, and
   an estimation unit,
   wherein the estimation unit is configured to derive a codebook level value associated with the identified codebook as a derived level value, wherein the codebook level value indicates a sum of averaged probability-weighted level sum values of all codewords of the identified codebook,
   wherein each of the averaged probability-weighted level sum values of the codewords of the identified codebook depends on how often a sequence of number values of a codeword of the identified codebook appears compared to other sequences of number values of other codewords of the identified codebook, wherein the estimation unit is configured to estimate a level estimate of the audio signal using the derived level value.

2. The apparatus according to claim 1, wherein the estimation unit further comprises a level value deriver,
wherein the level value deriver is adapted to derive the derived level value by looking up the level value associated with the identified codebook in a memory,
wherein the level value deriver is adapted to request the level value associated with the identified codebook from a local database, or
wherein the level value deriver is adapted to request the level value associated with the identified codebook from a remote computer.

3. The apparatus according to claim 2, further comprising a memory or a database having stored therein a plurality of codebook level memory values indicating a level value for a codebook, wherein each one of the plurality of codebooks has a codebook level memory value associated with it, stored in the memory or the database, and
wherein the level value deriver is configured for deriving the level value associated with the identified codebook as the level value by deriving a codebook level memory value associated with the identified codebook from the memory or from the database.

4. The apparatus according to claim 3, wherein the memory or the database has stored therein the plurality of codebook level memory values,
wherein each codebook level memory value indicates a sum of averaged probability-weighted level sum values of all codewords of an associated codebook, wherein the associated codebook is associated with the codebook level memory value,
wherein each averaged probability-weighted level sum value indicates a ratio of a probability-weighted level sum value of a codeword of the associated codebook by a dimension value associated with the associated codebook,
wherein each probability-weighted level sum value indicates a product of a level sum value of a considered codeword of the associated codebook by a probability value associated with the considered codeword of the associated codebook,
wherein each level sum value indicates a sum of values of a sequence of level values of a codeword of the associated codebook,
wherein each sequence of level values indicates a square value for each value of a sequence of inverse quantized number values of a sequence of number values of a codeword for each codeword of the associated codebook when the codebook level memory value is an energy value, or each sequence of level values indicates an absolute value for each value of a sequence of inverse quantized number values of a sequence of number values of a codeword for each codeword of the associated codebook when the codebook level memory value is an amplitude value, or each sequence of level values indicates a value being transformed to a loudness domain for each value of a sequence of inverse quantized number values of a sequence of number values of a codeword for each codeword of the associated codebook when the codebook level memory value is a loudness value, and
wherein each sequence of number values is a sequence of number values encoded by a codeword of the associated codebook.

5. The apparatus according to claim 1, wherein the estimation unit comprises a scaling unit,
wherein the scaling unit is adapted to derive a scalefactor relating to the encoded audio signal or to a portion of the encoded audio signal as a derived scalefactor,
wherein the scaling unit is adapted to acquire a scaled level value based on the scalefactor and the derived level value,
and wherein the estimation unit is adapted to estimate a level estimate of the audio signal using the scaled level value.

6. The apparatus according to claim 5,
wherein the derived level value is a derived energy value, and the scaling unit is adapted to apply the derived scalefactor on the derived energy value to acquire a scaled level value by multiplying derived energy value by the square of the derived scalefactor, or
wherein the derived level value is a derived amplitude value, and the scaling unit is adapted to apply the derived scalefactor on the derived amplitude value to acquire a scaled level value by multiplying derived amplitude value by the derived scalefactor, or
wherein the derived level value is a derived loudness value, and the scaling unit is adapted to transform the derived scalefactor to the loudness domain and to apply the transformed derived scalefactor on the derived loudness value to acquire a scaled level value.

7. The apparatus according to claim 1, wherein the estimation unit is configured for estimating the level estimate of the audio signal using the codebook level value indicating the sum of the averaged probability-weighted level sum values of all codewords of the identified codebook,
wherein each averaged probability-weighted level sum value indicates a ratio of a probability-weighted level sum value of a codeword of the identified codebook by a dimension value associated with the codebook,
wherein each probability-weighted level sum value indicates a product of a level sum value of a considered codeword of the identified codebook by a probability value associated with the considered codeword of the identified codebook,
wherein each level sum value indicates a sum of values of a sequence of level values of a codeword of the identified codebook,
wherein each sequence of level values indicates a square value for each value of a sequence of inverse quantized number values of a sequence of number values of a codeword for each codeword of the codebook when the codebook level value is an energy value, or each sequence of level values indicates an absolute value for each value of a sequence of inverse quantized number values of a sequence of number values of a codeword for each codeword of the codebook when the codebook level value is an amplitude value, or each sequence of level values indicates a value being transformed to a loudness domain for each value of a sequence of inverse quantized number values of a sequence of number values of a codeword for each codeword of the codebook when the codebook level value is a loudness value, and
wherein each sequence of number values is a sequence of number values encoded by a codeword of the codebook.

8. The apparatus according to claim 1, wherein the estimation unit further comprises a prediction filter adjuster, wherein the prediction filter adjuster is adapted to derive one or more prediction filter coefficients relating to the encoded audio signal or to a portion of the encoded audio signal as derived prediction filter coefficients, wherein the prediction filter adjuster is adapted to acquire a prediction-filter-adjusted level value based on the prediction filter coefficients and the derived level value, and wherein the estimation unit is adapted to estimate a level estimate of the audio signal using the prediction-filter-adjusted level value.

9. An apparatus for generating an output data stream from input data, comprising:

a receiver interface for receiving the input data comprising an encoded audio signal, an apparatus for level estimation of the encoded audio signal comprising:

a codebook determinator for determining a codebook from a plurality of codebooks as an identified codebook, wherein the audio signal has been encoded by employing the identified codebook, wherein the identified codebook comprises a plurality of codewords, and an estimation unit, wherein the estimation unit is configured to derive a codebook level value associated with the identified codebook as a derived level value, wherein the codebook level value indicates a sum of averaged probability-weighted level sum values of all codewords of the identified codebook, wherein each of the averaged probability-weighted level sum values of the codewords of the identified codebook depends on how often a sequence of number values of a codeword of the identified codebook appears compared to other sequences of number values of other codewords of the identified codebook, wherein the estimation unit is configured to estimate a level estimate of the audio signal using the derived level value, and a decider for deciding, whether a portion of the encoded audio signal is to be introduced into the output data stream or not, based on the level estimation for the portion of the output data stream.

10. The apparatus according to claim 9, wherein the apparatus further comprises a mixer, wherein the apparatus is adapted to generate a back data stream as output data stream for a plurality of participants in a teleconferencing system, wherein the receiver is adapted to receive a plurality of participant data streams comprising audio signals from the plurality of participants, wherein the decider is adapted to decide, whether a participant data stream is to be introduced into the back data stream or not, based on the level estimation for each participant data stream, and a mixer for only mixing the participant data streams to be introduced into the back data stream and for not introducing the participant data streams decided to be not introduced.

11. The apparatus according to claim 10, wherein the decider is adapted to decide that a considered participant data stream is not comprised in the back data stream when the level estimation of the considered participant data stream is below a threshold value.

12. The apparatus according to claim 10, wherein the decider is adapted to decide that the only data stream that is comprised in the back data stream is the data stream comprising a highest level estimation of level estimations of all participant data streams regarding a particular scalefactor band.

13. A method for generating a codebook level value for a codebook, comprising:

determining a sequence of number values associated with a codeword of the codebook for each codeword of the codebook, determining an inverse-quantized sequence of number values for each codeword of the codebook by applying an inverse quantizer to the number values of the sequence of number values of a codeword for each codeword of the codebook, determining a sequence of level values for each codeword of the codebook by determining a square of each value of the inverse-quantized sequence of number values of a codeword for each codeword of the codebook when an energy value is to be generated as codebook level value, or by determining a sequence of level values for each codeword of the codebook by determining an absolute value of each value of the inverse-quantized sequence of number values of a codeword for each codeword of the codebook when an amplitude value is to be generated as codebook level value, or by transforming each value of the inverse-quantized sequence of number values of a codeword to a loudness domain for each codeword of the codebook when a loudness value is to be determined as codebook level value, calculating a level sum value for each codeword of the codebook by summing values of the sequence of level values for each codeword of the codebook, determining a probability-weighted level sum value for each codeword of the codebook by multiplying the level sum value of a codeword by a probability value associated with the codeword for each codeword of the codebook, determining an averaged probability-weighted level sum value for each codeword of the codebook by dividing the probability-weighted level sum value of a codeword by a dimension value associated with the codebook for each codeword of the codebook, and calculating the codebook level value by summing the averaged probability-weighted level sum values of all codewords.

14. The method according to claim 13, wherein the probability value associated with the codeword is calculated according to the formula:

$$2^{-(length(codeword))}$$

wherein length(codeword) indicates the length of the codeword.

15. An apparatus for buffer management comprising:

a buffer access unit for accessing buffer audio data of a buffer as accessed buffer audio data, wherein the buffer audio data comprises an encoded audio signal, an apparatus for level estimation of the encoded audio signal comprising:

a codebook determinator for determining a codebook from a plurality of codebooks as an identified codebook, wherein the audio signal has been encoded by employing the identified codebook, and an estimation unit, wherein the estimation unit is configured to derive a codebook level value associated with the identified codebook as a derived level value, wherein the codebook level value indicates a sum of averaged probability-weighted level sum values of all codewords of the identified codebook, wherein each of the averaged probability-weighted level sum values of the codewords of the identified codebook depends on how often a sequence of number values of a codeword of the identified codebook appears compared to other sequences of number values of other codewords of the identified codebook, and a decider for deciding, whether the accessed buffer audio data is to be deleted from the buffer or not, based on the level estimation of the encoded audio signal, wherein the estimation unit estimates the level estimation of the encoded audio signal depending on the derived level value which depends on a sequence of level values for each codeword of the identified codebook, and each level value of the sequence of level values indicates a value of the each codeword of the identified codebook.

16. A method for level estimation of an encoded audio signal, comprising:

determining a codebook from a plurality of codebooks as an identified codebook, wherein the audio signal has been encoded by employing the identified codebook, deriving a codebook level value associated with the identified codebook as a derived level value, wherein the codebook level value indicates a sum of averaged probability-weighted level sum values of all codewords of the identified codebook, wherein each of the averaged probability-weighted level sum values of the codewords of the identified codebook depends on how often a sequence of number values of a codeword of the identified codebook appears compared to other sequences of number values of other codewords of the identified codebook, and estimating a level estimate of the audio signal using the derived level value.

17. A method for generating an output data stream from input data, comprising:

receiving the input data comprising an encoded audio signal, determining a codebook from a plurality of codebooks as an identified codebook, wherein the audio signal has been encoded by employing the identified codebook, deriving a codebook level value associated with the identified codebook as a derived level value, wherein the codebook level value indicates a sum of averaged probability-weighted level sum values of all codewords of the identified codebook, wherein each of the averaged probability-weighted level sum values of the codewords of the identified codebook depends on how often a sequence of number values of a codeword of the identified codebook appears compared to other sequences of number values of other codewords of the identified codebook, estimating a level estimate of the audio signal using the derived level value, and deciding, whether a portion of the encoded audio signal is to be introduced into the output data stream or not, based on the level estimate for the portion of the output data stream.

18. A method for storing input data comprising an encoded audio signal in a buffer, comprising:

receiving the input data comprising the encoded audio signal, determining a codebook from a plurality of codebooks as an identified codebook, wherein the audio signal has been encoded by employing the identified codebook, deriving a codebook level value associated with the identified codebook as a derived level value, wherein the codebook level value indicates a sum of averaged probability-weighted level sum values of all codewords of the identified codebook, wherein each of the averaged probability-weighted level sum values of the codewords of the identified codebook depends on how often a sequence of number values of a codeword of the identified codebook appears compared to other sequences of number values of other codewords of the identified codebook, estimating a level estimate of the audio signal using the derived level value, and deciding, whether a portion of the encoded audio signal is to be stored in the buffer or not, based on the level estimate for the portion of the output data stream, wherein the estimating of the level estimate of the audio signal depends on the derived level value which depends on a sequence of level values for each codeword of the identified codebook, and each level value of the sequence of level values indicates a value of the each codeword of the identified codebook.

19. A non-transitory computer readable medium including a computer program implementing, when being executed by a computer or a signal processor, a method for generating a codebook level value for a codebook comprising: determining a sequence of number values associated with a codeword of the codebook for each codeword of the codebook, determining an inverse-quantized sequence of number values for each codeword of the codebook by applying an inverse quantizer to the number values of the sequence of number values of a codeword for each codeword of the codebook, determining a sequence of level values for each codeword of the codebook by determining a square of each value of the inverse-quantized sequence of number values of a codeword for each codeword of the codebook when an energy value is to be generated as codebook level value, or by determining a sequence of level values for each codeword of the codebook by determining an absolute value of each value of the inverse-quantized sequence of number values of a codeword for each codeword of the codebook when an amplitude value is to be generated as codebook level value, or by transforming each value of the inverse-quantized sequence of number values of a codeword to a loudness domain for each codeword of the codebook when a loudness value is to be determined as codebook level value, calculating a level sum value for each codeword of the codebook by summing the values of the sequence of level values for each codeword of the codebook, determining a probability-weighted level sum value for each codeword of the codebook by multiplying the level sum value of a codeword by a probability value associated with the codeword for each codeword of the codebook, determining an averaged probability-weighted level sum value for each codeword of the codebook by dividing the probability-weighted level sum value of a codeword by a dimension value associated with the codebook for each codeword of the codebook, and calculating the codebook level value by summing the averaged probability-weighted level sum values of all codewords, wherein a level estimate of the audio signal is estimated depending on the derived level value which depends on a sequence of level values for each codeword of the identified codebook, and each level value of the sequence of level values indicates a value of the each codeword of the identified codebook.

20. A non-transitory computer readable medium including a computer program implementing, when being executed by a computer or a signal processor, a method for level estimation of an encoded audio signal comprising:
  determining a codebook from a plurality of codebooks as an identified codebook, wherein the audio signal has been encoded by employing the identified codebook,
  deriving a codebook level value associated with the identified codebook as a derived level value, wherein the codebook level value indicates a sum of averaged probability-weighted level sum values of all codewords of the identified codebook, wherein each of the averaged probability-weighted level sum values of the codewords of the identified codebook depends on how often a sequence of number values of a codeword of the identified codebook appears compared to other sequences of number values of other codewords of the identified codebook, and
  estimating a level estimate of the audio signal using the derived level value.

21. A non-transitory computer readable medium including a computer program implementing, when being executed by a computer or a signal processor, a method for generating an output data stream from input data comprising:
  receiving the input data comprising an encoded audio signal, determining a codebook from a plurality of codebooks as an identified codebook, wherein the audio signal has been encoded by employing the identified codebook,
  deriving a codebook level value associated with the identified codebook as a derived level value, wherein the codebook level value indicates a sum of averaged probability-weighted level sum values of all codewords of the identified codebook, wherein each of the averaged probability-weighted level sum values of the codewords of the identified codebook depends on how often a sequence of number values of a codeword of the identified codebook appears compared to other sequences of number values of other codewords of the identified codebook,
  estimating a level estimate of the audio signal using the level value, and
  deciding, whether a portion of the encoded audio signal is to be introduced into the output data stream or not, based on the level estimate for the portion of the output data stream, wherein
  the estimating of the level estimate of the audio signal depends on the derived level value which depends on a sequence of level values for each codeword of the identified codebook, and
  each level value of the sequence of level values indicates a value of the each codeword of the identified codebook.

22. A non-transitory computer readable medium including a computer program implementing, when being executed by a computer or a signal processor, a method for storing input data comprising an encoded audio signal in a buffer comprising:
  receiving the input data comprising the encoded audio signal, determining a codebook from a plurality of codebooks as an identified codebook, wherein the audio signal has been encoded by employing the identified codebook,
  deriving a codebook level value associated with the identified codebook as a derived level value, wherein the codebook level value indicates a sum of averaged probability-weighted level sum values of all codewords of the identified codebook, wherein each of the averaged probability-weighted level sum values of the codewords of the identified codebook depends on how often a sequence of number values of a codeword of the identified codebook appears compared to other sequences of number values of other codewords of the identified codebook,
  estimating a level estimate of the audio signal using the level value, and
  deciding, whether a portion of the encoded audio signal is to be stored in the buffer or not, based on the level estimate for the portion of the output data stream, wherein
  the estimating of the level estimate of the audio signal depends on the derived level value which depends on a sequence of level values for each codeword of the identified codebook, and
  each level value of the sequence of level values indicates a value of the each codeword of the identified codebook.

* * * * *